Oct. 5, 1965 W. O. JONES 3,209,892
MEANS AND METHOD FOR CLASSIFYING AND PILING SHEETS
Original Filed March 29, 1957 7 Sheets-Sheet 1

INVENTOR
Walter O. Jones
his attorneys

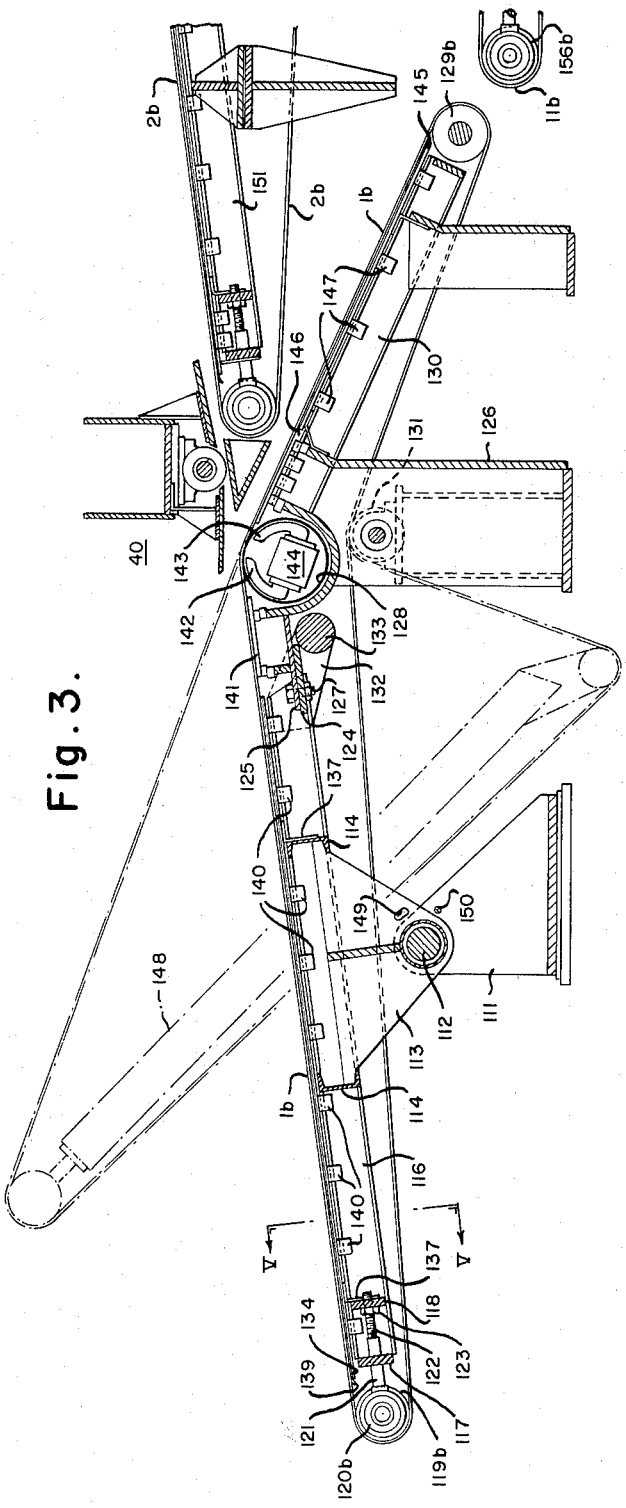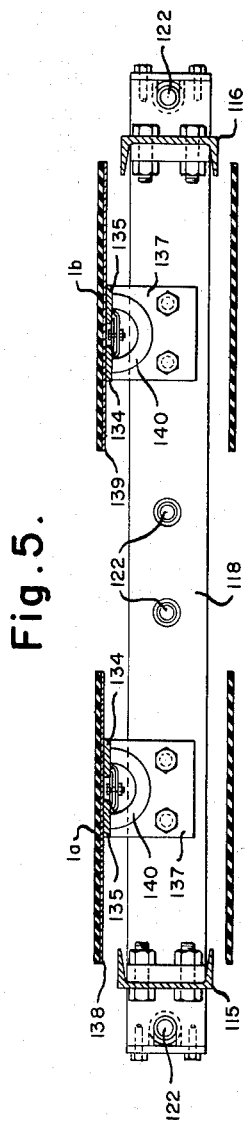
INVENTOR
Walter O. Jones

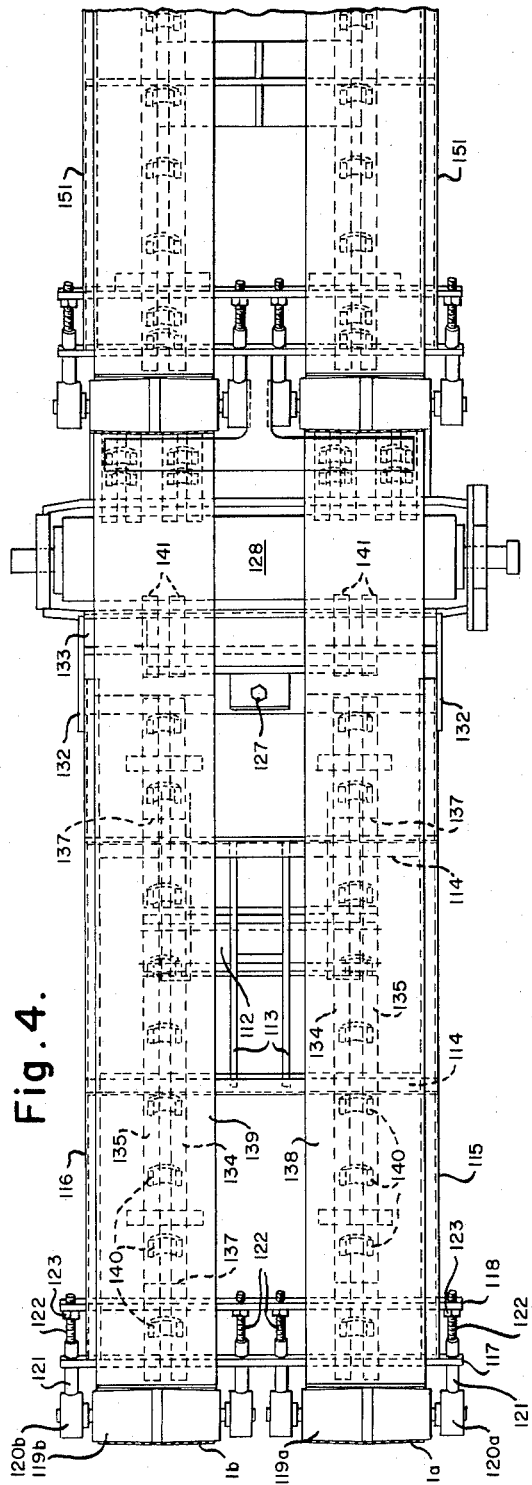
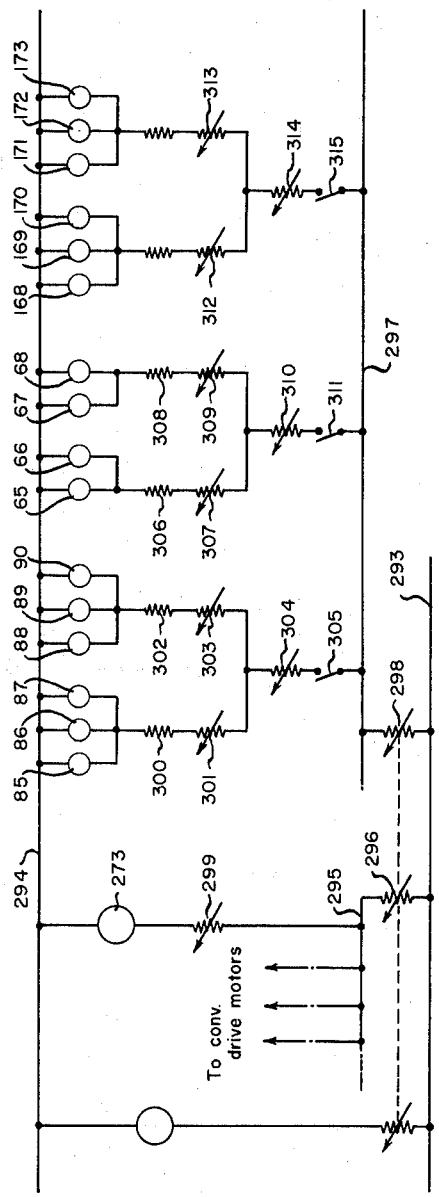
Fig. 4.
Fig. 14.
INVENTOR
Walter O. Jones

Oct. 5, 1965 W. O. JONES 3,209,892
MEANS AND METHOD FOR CLASSIFYING AND PILING SHEETS
Original Filed March 29, 1957 7 Sheets-Sheet 4
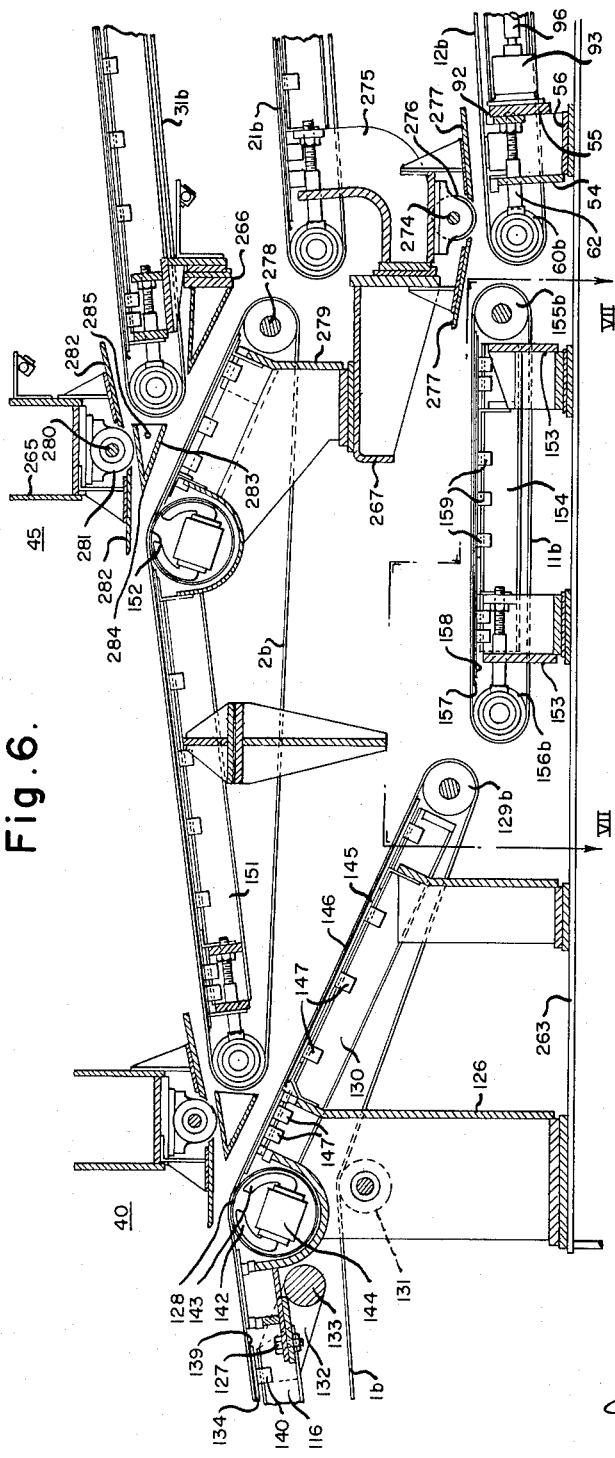
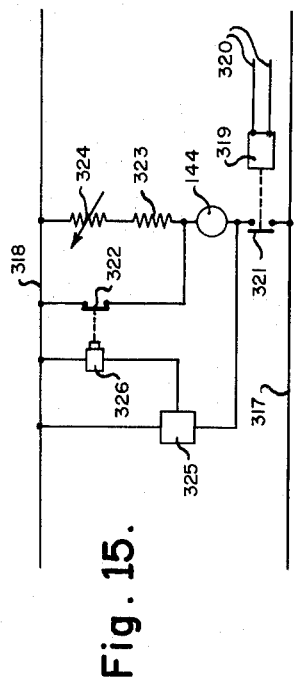
INVENTOR
Walter O. Jones Oct. 5, 1965    W. O. JONES    3,209,892
MEANS AND METHOD FOR CLASSIFYING AND PILING SHEETS
Original Filed March 29, 1957    7 Sheets-Sheet 5
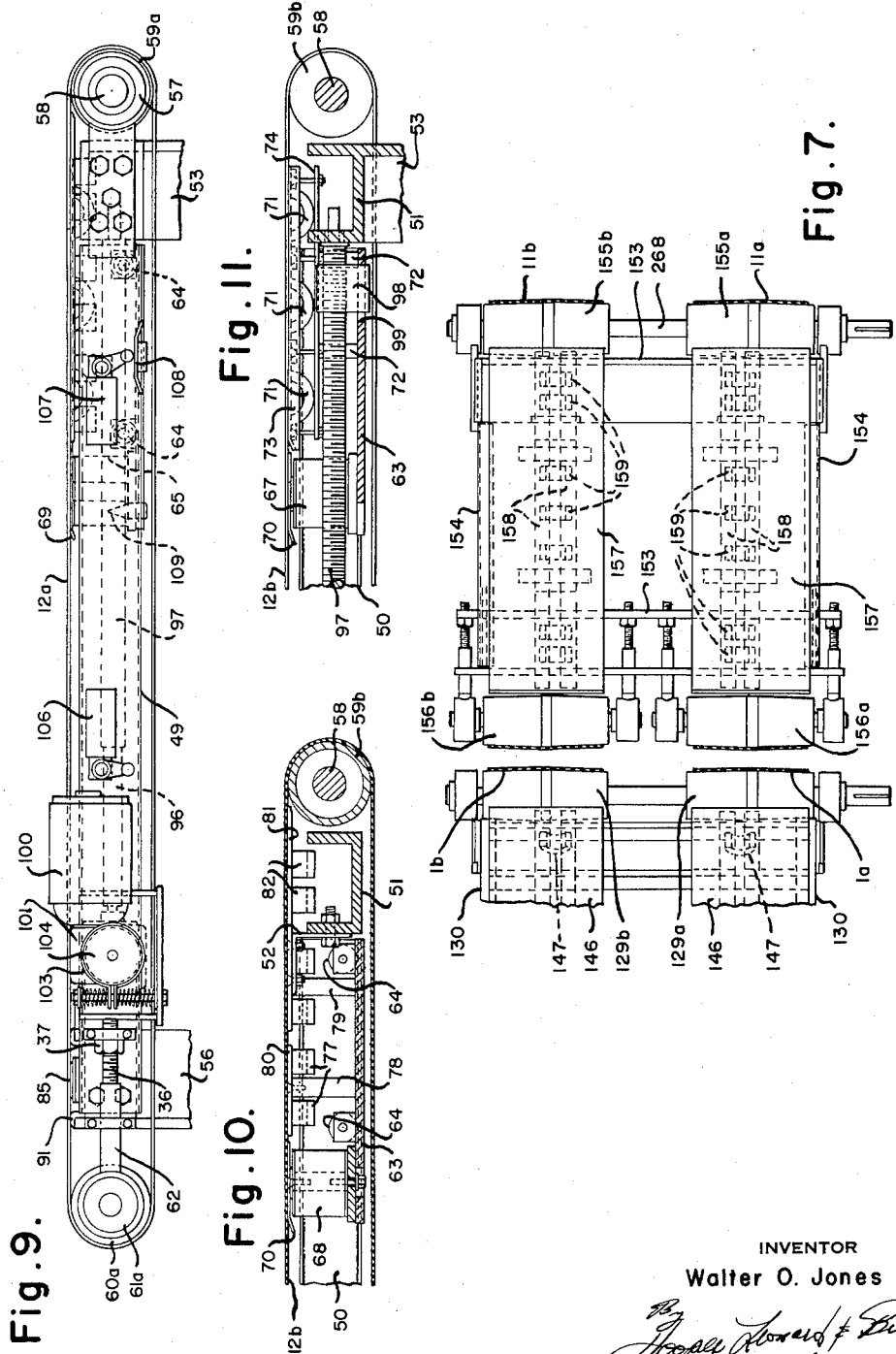
INVENTOR
Walter O. Jones Oct. 5, 1965  W. O. JONES  3,209,892
MEANS AND METHOD FOR CLASSIFYING AND PILING SHEETS
Original Filed March 29, 1957  7 Sheets-Sheet 6

INVENTOR
Walter O. Jones
his attorneys

Oct. 5, 1965   W. O. JONES   3,209,892
MEANS AND METHOD FOR CLASSIFYING AND PILING SHEETS
Original Filed March 29, 1957   7 Sheets-Sheet 7

INVENTOR
Walter O. Jones

United States Patent Office 3,209,892
Patented Oct. 5, 1965

3,209,892
MEANS AND METHOD FOR CLASSIFYING
AND PILING SHEETS
Walter O. Jones, Warren, Ohio, assignor to The Wean
Engineering Company, Inc., Warren, Ohio, a corporation of Ohio
Original application Mar. 29, 1957, Ser. No. 649,438, now
Patent No. 3,104,006, dated Sept. 17, 1963. Divided
and this application Sept. 24, 1962, Ser. No. 231,313
5 Claims. (Cl. 198—41)

This application is a division of my copending application Serial No. 649,438, filed March 29, 1957, which matured as United States Patent No. 3,104,006. Subject matter disclosed but not claimed herein is claimed in my copending applications Serial Nos. 344,297 and 344,420, filed February 12, 1964.

This invention relates to classifying and piling sheets. It is particularly suited for use with thin flat steel sheets having variations of thickness and color, perforations and other defects.

In the steel industry, it has been the practice to roll wide strip of relatively thin gauge from basic steel products. Much of the strip is eventually used in sheet form and must be cut into sheets and then stacked in piles. In many instances various properties of the sheet are important to the final product, and it becomes necessary to segregate imperfect sheets from those which meet required specifications. For example, it is common practice to plate steel strip electrolytically with tin. The tin strip is then cut into sheets of desired size for use in making cans or other tinplate products. It has long been important that the sheets be of the proper thickness, that the steel have an adherent coating of tin which is unmarked by discolorations, and that the strip be free of perforations or pinholes. Other standards may also be adopted in particular circumstances. Customarily, gauge means and pinhole detectors of well-known design are mounted to examine moving strip coming from the tin line. The strip may also be inspected visually for discolorations. Following these inspections, the strip is passed through a shear where it is cut into sheets of the desired length. The sheets are then separated, sorting out those containing pinholes, discolorations, which are off-gauge and the like. A sheet classifier and associated gauge means of conventional design is illustrated in Kaufman Patent 2,146,581, for example.

The actual separation of the sheets issuing from the shear is customarily made by a sheet classifier which mechanically separates and piles the sheets. A conveyor is ordinarily provided which carries sheets away from the shear at a higher speed than strip is entering the shear, thereby leaving an open space between sheets on the conveyor. The sheets are then diverted at classifying stations to one of several flights of conveyors which overlap the sheets carried by that flight and deposit them at a piling station. Classifiers are also used in shear lines where the sole purpose is to cut strip into sheets and to classify it.

In some instances where it is desired only to pile the sheets, they are passed through the classifier for the sole purpose of piling them. The only part of the classifier which is then used is one flight of conveyors and one piling station. All of the sheets may be optionally diverted at a classifying station alternatively to one piling station and then to another piling station for convenient removal of full piles of sheets.

Conventional classifiers are subject to many objections. As the speed of the sheets on conventional classifiers increases, they become progressively more difficult to handle, particularly when they transfer from one conveyor to another. When the sheets are lapped and piled, it is essential that their ends lap one above another in a regular pattern, both to avoid damage to the sheets and to avoid cobbles caused by improperly lapped sheets which will jam the entire classifier and spoil many of the sheets then in the classifier. These problems have limited speeds of conventional classifiers to about 650 to 750 feet per minute. Although the machines have higher mechanical speeds, trouble is usually experienced during actual operating conditions when the speed of sheets coming to the classifier exceeds the stated figure and is sometimes encountered at lower speeds. The speed at which strip can be handled in a trimming line and through a shear is usually limited by the speed at which the classifier itself can satisfactorily operate. Conventional classifiers frequently produce cobbles both when they are speeding up to and slowing down from customary operating speeds. It is periodically necessary to change blades and to make adjustments in the shears employed with sheet classifiers. The necessary placement of the classifier adjacent to the shear limits access to the shear and increases the difficulty of making necessary changes and adjustments.

I provide an entrance conveyor, at least one sheet classifying station, means to convey sheets from each classifying station to lap the sheets and to pile them. I preferably provide a plurality of endless belt conveyors and magnetic means holding the sheets to said belts. I prefer to provide magnetic sheet attracting means beneath the belts of the conveyors and extending along a substantial portion of their length. I provide magnetic sheet classifying means at each classifying station, preferably providing selectively operable magnetic sheet attracting means beneath the sheet pass line and magnetic sheet attracting means above the sheet pass line. Preferably, I provide means to vary the magnetic fields adjacent the classifying stations in accordance with the desired classification of the sheets. I provide magnetic means at conveyor transfer points spaced above the conveyors. I preferably provide sheet catching conveyors having magnetic sheet attracting means shiftable longitudinally along the axis thereof. I provide a plurality of conveyors to lap and pile sheets and having magnetic means associated with said conveyors and between said conveyors. I preferably provide a piling conveyor optionally extensible for varying sizes of sheets. I further prefer to provide sheet piling guides which are longitudinally movable, transversely movable and simultaneously transversely shiftable.

Other details, objects and advantages of my invention will become apparent as the following description of a present preferred embodiment of my invention proceeds.

In the accompanying drawings, I have illustrated a present preferred embodiment of my invention in which FIGURE 1 is a schematic elevational view of a three pile classifier embodying my invention;

FIGURE 3 is a side view of the entrance conveyor and one of the classifying stations taken in section;

FIGURE 4 is a plan view of the conveyors shown in FIGURE 3 without the overhanging classifying apparatus and with some belt portions removed;

FIGURE 5 is a sectional view taken on line V—V of FIGURE 3;

FIGURE 6 is a side view of a part of the classifier taken in section, overlapping FIGURE 3 and showing a second classifying station and one of the sheet lapping stations;

FIGURE 7 is a sectional view taken along line VII—VII of FIGURE 6;

FIGURE 9 is a side elevational view of the conveyor shown in FIGURE 8;

FIGURE 10 is a partial sectional view taken on line X—X of FIGURE 8;

FIGURE 11 is a partial sectional view taken on line XI—XI of FIGURE 8;

FIGURE 14 is a wiring diagram showing the circuits for some of the conveyor drive motors and electromagnets; and FIGURE 15 is a wiring diagram schematically showing the circuit for one of the magnetic classifying rolls.

General arrangement

Figure 1:
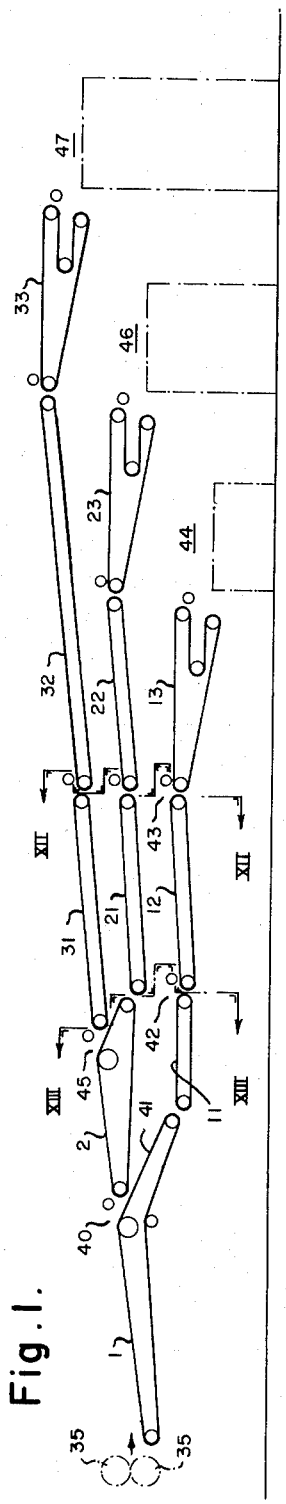

A sheet classifier embodying the invention is schematically shown in FIGURE 1. An entrance conveyor 1 receives sheets from a shear and carries them away from the shear at a higher speed than strip entering the shear, thereby producing a spacing between sheets on conveyor 1. The sheets pass between pinch rolls 35 which are associated and synchronized in speed with the shear. Sheets issuing from between pinch rolls 35 are deposited directly on entrance conveyor 1. The conveyor is provided with three sheet piling stations 44, 46 and 47. Sheets which have pinholes are piled at station 44, sheets which are off-gauge are piled at station 46 and prime sheets are piled at station 47. Sheets on conveyor 1 are carried to a classifying station 40 at which point they are classified, off-gauge and prime sheets passing to a transfer conveyor 2 and pinhole sheets going down the descending sloped section 41 of conveyor 1. The pinhole sheets passing down slope 41 of conveyor 1 will then pass to a lapping conveyor 11. They pass from conveyor 11 through a lapping station indicated generally at 42 to a catching conveyor 12 on which the ends of consecutive sheets are overlapped. The lapped sheets on conveyor 12 then pass through a station indicated generally at 43 to piling conveyor 13. In passing from conveyor 12 to conveyor 13, the sheets become overlapped to a greater degree than on conveyor 12. They are deposited by conveyor 13 at pinhole piling station 44. The prime and off-gauge sheets on conveyor 2 are carried to a second classifying station indicated generally at 45. Off-gauge sheets are deflected to lapping conveyor 21 on the second conveyor flight, thence to catching conveyor 22 and piling conveyor 23. Sheets proceeding along the second conveyor flight are formed in a pile at off-gauge piling station 46. Prime sheets are deposited on lapping conveyor 31 and are in like manner transferred to catching conveyor 32, piling conveyor 33 and piling station 47.

Figure 2:
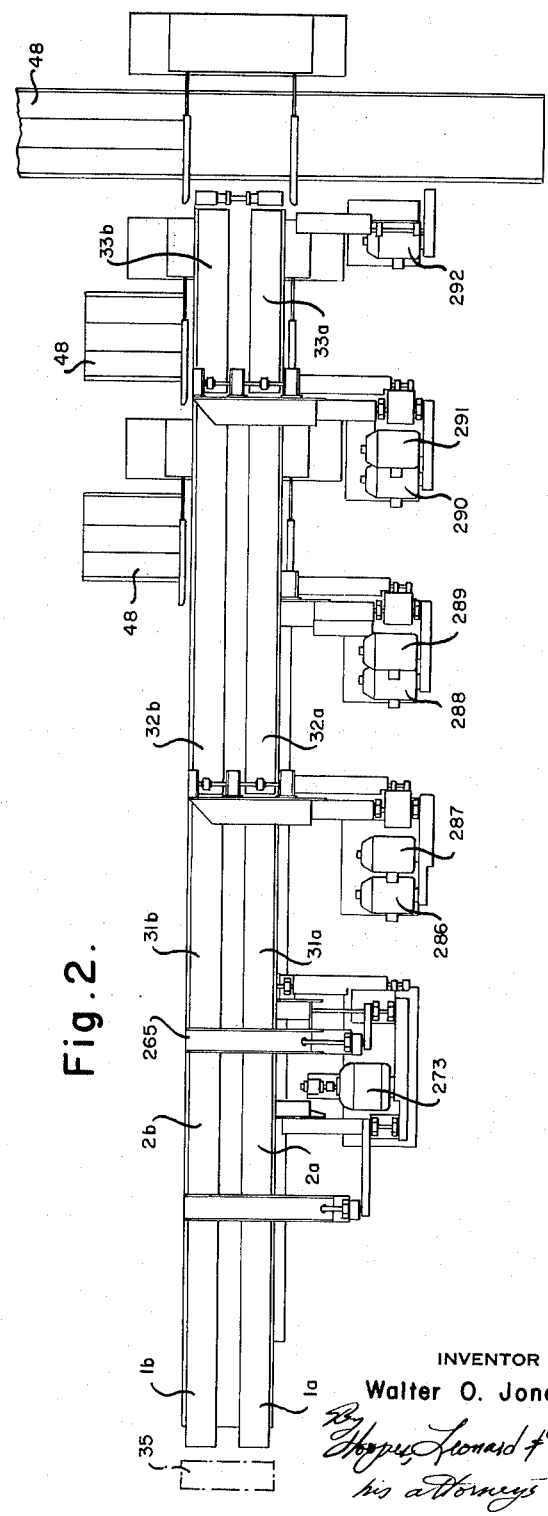
FIGURE 2 is a plan view of the classifier shown in FIGURE 1 showing somewhat greater detail.
Figure 8:
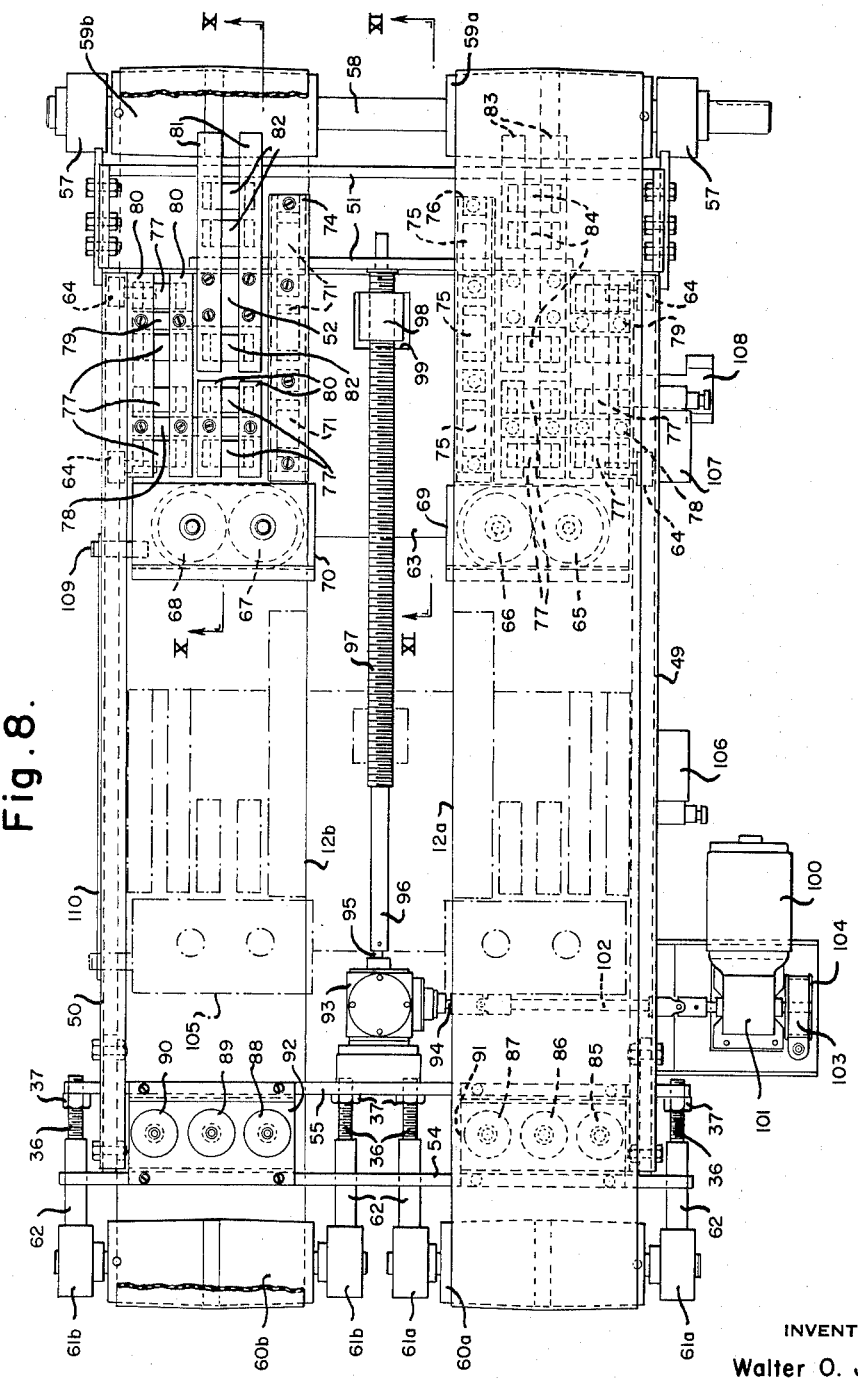
FIGURE 8 is a plan view of one of the catching conveyors.

The classifier is shown in plan in FIGURE 2. Belt conveyors are used throughout the classifier, and, for convenience, the belts are divided into two belt sections which run side by side. The belts are identified throughout by the same number as the associated conveyor with the letters *a* and *b* being used to designate the separate belt sections. Conveyors 48 are placed at floor level to carry piles of sheets away from the piling stations.

The classifier which is illustrated is provided with three piling stations. A classifier having the same general details of construction, but with different numbers of piling stations, could readily be employed by omitting one flight of conveyors or by adding additional flights.

The entrance conveyor

Entrance conveyor 1 (FIGURES 3, 4, 5 and 6) is mounted on a base 111 in which a pivot pin 112 is pivotally mounted. Support 113 is mounted upon pivot pin 112 and has two cross members 114 welded to it, which in turn support the side members 115 and 116 of the entrance conveyor frame. Two cross members 117 and 118 are attached to side members 115 and 116 adjacent the tail pulley end of the conveyor. The conveyor tail pulley comprises two halves 119a and 119b which are journaled in bearings 120a and 120b, respectively. Bearings 120a and 120b are mounted on bearing supports 121 which are slidably mounted in cross member 117. The supports have threaded portions 122 formed on their end. Nuts 123 are placed on threads 122 leaving projecting ends extending through holes in cross member 118. Cross member 124 extends between side members 115 and 116 adjacent classifying station 40. In the normal position of the entrance conveyor, cross member 124 is in juxtaposition to plate 125 which is supported from base 126. Aligned holes in cross member 124 and plate 125 receive a bolt and nut 127. The conveyor changes direction at magnetic roll 128 and terminates at a head pulley having two sections 129a and 129b. Conveyor side frames 130 extend between magnetic roll 128 and the conveyor head pulley. A sectional belt idler pulley 131 is located beneath magnetic roll 128 and supports and guides the belt sections returning from the head pulley to the tail pulley. A belt slack take-up comprises arms 132 which are supported from side frames 115 and 116. A round bar 133 attached to arms 132 extending across the width of the conveyor actually engages the belt. The take-up is inoperative when the entrance conveyor is in normal position, but becomes effective in belt take-up position when the conveyor is raised as indicated at 148.

Under each belt half 1a and 1b, two parallel pole pieces 134 and 135 are mounted from brackets 137 attached to one of the cross members 114 and to cross member 118. Two aprons 138 and 139 are attached above the pole pieces, one apron being positioned beneath each belt section. A plurality of permanent horseshoe magnets 140 are fastened beneath each pair of pole pieces 134 and 135 with all of the north poles of the horseshoe magnets being placed against one of the pole pieces and all of the south poles being placed against the other pole piece. The pole pieces maintain a strong magnetic field along the length of the conveyor and extend it virtually to the tail pulley. Additional pole pieces 141 are positioned adjacent magnetic roll 128 with their ends extending from pole pieces 134 and 135 as closely as possible to magnetic roll 128. Magnetic roll 128 is hollow and has an electromagnet placed therein which extends substantially throughout the length of the roll. The electromagnet comprises two pole pieces 142 and 143 on which coils 144 are mounted at intervals. The electromagnet is mounted in a normally fixed position and the outer shell of the roll is free to rotate. The angular position of the electromagnet may be adjusted about the axis of the roll to change the line along which the magnetic field is concentrated. Once the angular position of the pole pieces has been fixed for a given installation, there will be little need to change it. On the section of conveyor 1 between magnetic roll 128 and head pulley 129, pole pieces 145, aprons 146 and horseshoe magnets 147 are mounted in a manner similar to that which has been described. The pole pieces extend the field from magnetic roll 128 to head pulley 129.

It will be apparent that the portion of entrance conveyor 1 between the tail pulley and magnetic roll 128 can be rotated about pivot pin 112. When the conveyor is in the lowered position illustrated in FIGURE 3, its center of gravity will be between pivot pin 112 and the tail pulley. It is locked in this position by nut and bolt 127. The conveyor may be readily moved to a raised position, shown in dotted outline 148, by removing bolt and nut 127 and pushing upwardly adjacent the conveyor tail pulley. When the conveyor has been lifted to its raised position 148, the center of gravity will be between pivot pin 112 and magnetic roll 128, and slot 149 in support 113 will be aligned with hole 150 in base 111. A pin may be inserted therethrough to prevent the conveyor from being accidentally returned to ordinary operating position. Adequate clearance is then provided for repairs and adjustments to the shear.

Transfer conveyor 2 (FIGURES 3, 4 and 6) is similar in details of construction to entrance conveyor 1. It has side members 151 which extend between classifying station 40 and classifying station 45. A magnetic roll 152 is placed adjacent classifying station 45 and is identical to magnetic roll 128. Conveyor 2 has a downwardly sloping portion which leads to the conveyor head pulley and lapping conveyor 21. It should be noted that side members 151 are fixed in position and that conveyor 2 is not shiftable to a raised position. As with conveyor 1, the conveyor tail pulley may be adjusted for varying lengths of belt sections. The detailed arrangement of aprons, magnets and pole pieces is substantially similar to that of conveyor 1.

The lapping conveyors

The lapping conveyors 11, 21 and 31 are similar in their details of construction. Lapping conveyor 11 (FIGURES 6 and 7) is mounted upon bases 153 which are mounted on a sub-base 263 and which support side members 154. The belt sections 11a and 11b run over a head pulley having sections 155a and 155b mounted on a shaft 268 and a tail pulley having sections 156a and 156b, respectively. Apron plates 157, pole pieces 158 and horseshoe magnets 159 are provided similarly to those already described. Tail pulley sections 156a and 156b are adjustable in the same manner as those previously described. Shaft 268 is journaled on the conveyor frame in a conventional manner. Lapping conveyors 21 and 31 are similar to lapping conveyor 11 except that as can be seen from FIGURE 1, they are of greater length. The side members, belts, aprons and pole pieces are of greater length and a larger number of magnets is employed along the length of those conveyors.

The catching conveyors

The catching conveyors 12, 22 and 32 are placed to receive lapped sheets from lapping conveyors 11, 21 and 31, respectively. The frame of catching conveyor 12 (FIGURES 6, 8, 9, 10 and 11) has two channel-shaped side members 49 and 50. A cross member 51 extends between and supports side members 49 and 50 at the head pulley end of the conveyor. Cross member 51 is supported from below by base 53. Two cross members 54 and 55 extend between and support side members 49 and 50 at the tail pulley end of conveyor 12 and are supported by base 56. Two head pulley bearings 57 are supported from side members 49 and 50 and have a head pulley shaft 58 journaled in them. The two conveyor belt sections 12a and 12b run over head pulley sections 59a and 59b, respectively. The conveyor tail pulley is divided into two sections 60a and 60b which are separately journaled in bearings 61a and 61b. In the manner previously described, the tail pulley bearings 61a and 61b are mounted on support members 62 which are slidably mounted in holes drilled in cross member 54. Supports 62 have threaded portions 36 on which nuts 37 are placed. The projecting threaded ends 36 extend through holes in cross member 54. Tail pulley sections 60a and 60b may be adjusted by rotation of nuts 37 to compensate for variations and irregularities in the length of belts 12a and 12b due to wear and the like.

A carriage is fitted between the upper and lower reaches of the belts and between side members 49 and 50. The carriage comprises a bottom plate 63 hung from rollers 64 which travel on the lower flanges of channels 49 and 50. Four electromagnets 65, 66, 67 and 68 are mounted on bottom plate 63 of the carriage. An apron 69 is placed above electromagnets 65 and 66 and a similar apron 70 is placed above electromagnets 67 and 68. Aprons 69 and 70 are above the electromagnets between them and the upper reach of the conveyor belt sections. Three permanent horseshoe magnets 71 are fastened adjacent the center line of the conveyor beneath belt sections 12b. The magnets are held firmly in position between a pole piece 73 and a retainer 74 which are drawn against magnets 71 by bolts and are supported by supports 72. In like manner, permanent horseshoe magnets 75 and their associated pole piece 76 are positioned beneath belt section 12a. Additional magnets 77 and pole pieces 80 are supported beneath belt sections 12a and 12b from bottom plate 63 by supports 78 and 79. Magnets 77 are held to the pole pieces by spring clips which have been omitted for purposes of illustration, but which are of well-known conventional design. Additional pole pieces 81 are supported beneath belt section 12b from cross member 51 by bracket 52 and have horseshoe magnets 82 attached by conventional spring clips. A like set of pole pieces 83 and magnets 84 is positioned on the opposite side of the conveyor center line beneath belt section 12a. Electromagnets 85, 86, 87, 88, 89 and 90 are mounted between cross members 54 and 55 adjacent the tail pulley end of conveyor 12. Electromagnets 85, 86 and 87 are supported from cross members 54 and 55 by a cradle 91, and electromagnets 88, 89 and 90 are supported in like manner by cradle 92.

A gearbox 93 is mounted on cross member 55 at the conveyor center line. It has an input shaft 94 and an output shaft 95. A shaft 96, having a threaded section 97, is attached to output shaft 95 and is journaled at its other end in cross member 51. A block 98 is threaded on shaft 96 and fits in hole 99 in the bottom plate 63 of the carriage. An electric motor 100 mounted on side member 49 drives input shaft 94 through a gearbox 101 and a connecting shaft 102. A spring-loaded brake band 103 is continuously applied against a drum 104 mounted on an extension of the output shaft of gearbox 101. Rotation of motor 100 will cause the carriage to move as desired between the position shown in FIGURE 8 and the position generally indicated in dotted outline 105. Two limit switches 106 and 107 are mounted on side member 49 and are actuated by a ramp 108 extending from bottom plate 63 of the carriage. They prevent overtravel of the carriage by cutting power to motor 100 when the carriage has reached the limit of its travel. A pointer 109 is mounted upon bottom plate 63 and may be read against a scale 110 which is conveniently calibrated for the length of sheets being handled in the classifier.

Catching conveyor 22 is virtually identical to catching conveyor 12. Catching conveyor 32 has the same general construction as catching conveyor 12 but is slightly modified. It has a movable carriage having the same relationship to the tail pulley as is shown for conveyor 12. In the space between the carriage and the conveyor head pulley, a pair of longitudinal pole pieces is provided beneath each belt section extending from the limit of carriage travel to the conveyor head pulley in a manner similar to that of conveyor 1. Thus, the carriage bears the same relationship to the tail pulley in each case, but on conveyor 32, pole pieces and permanent horseshoe magnets of the type previously described extend from the carriage to the head pulley.

The support and drive assemblies

Figure 13:
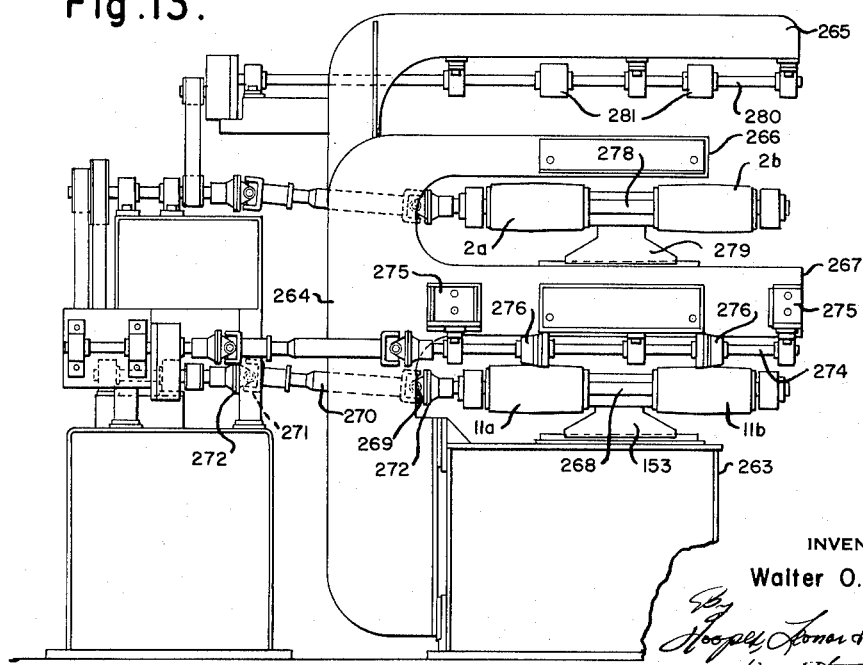
FIGURE 13 is a sectional view taken along line XIII—XIII of FIGURE 1.

The support and drive assemblies provide support for the conveyors and supply power to the conveyor shafts. The assemblies are all substantially alike. Referring to FIGURE 13, which is a view taken at classifying station 45, an upright frame 264 having overhanging arms 265, 266 and 267 from top to bottom, respectively, is mounted upon subbase 263. As previously indicated, base 153 of conveyor 11 is mounted upon subbase 263. The two sections of lapping conveyor head pulley 155a and 155b are mounted on a shaft 268 which is journaled on the conveyor frame as previously described. Universal joint 269 is attached to the end of shaft 268 and is connected through an extensible drive shaft 270 to a universal joint 271. It will be noted that shaft 270 and the two universal joints are connected to the remainder of the drive train by couplings comprising opposed flanges 272. Each pair of flanges is fastened together with bolts (not illustrated) which may be readily removed, thus breaking the flanges of either coupling. Universal joint 271 is driven by motor 273 (FIGURE 2) through a series of timing belts and countershafts in any convenient manner. The motor, countershafts and timing are all separately mounted to one side of the classifier and drive through extensible drive shafts. A shaft 274 is journaled on brackets 275 (FIGURES 6 and 13) which are mounted on overhanging arm 267. Two tapered frusto-conical permanent magnet rolls 276 are mounted upon shaft 274 above the belt sections of conveyor 12. Rolls 276 are generally above the tail pulley of conveyor 12, and their circumference is generally tangent to the upper surface of conveyor 11. Shaft 276 is driven in the same manner as shaft 268. It is driven in an opposite direction of rotation from shaft 268, and its speed is somewhat higher. The shaft speeds are adjusted to make the speed of belts 12a and 12b and the tangential speed of rolls 276 equal. Guide plates 277 are placed on either side of rolls 276 and are nearly tangent to the rolls, with only a small part of the circumference of rolls 276 projecting below guides 277 at any given time. Head pulley shaft 278 of conveyor 2 is mounted on base 279 which rests on the upper face of overhanging arm 267. It is likewise driven by motor 273 through a series of belts and countershafts at the same speed as the head pulley shaft of conveyor 1. Arm 266 also supports conveyor 31 below its tail pulley end. A shaft 280 is journaled on the lower side of overhanging arm 265. Two cylindrical magnetic rolls 281 are mounted on the shaft generally tangent to the upper surfaces of conveyors 2 and 31. Shaft 280 is driven through similar drive means by motor 273. Guide plates 282 are fixed on either side of rolls 281 and only a small part of the circumference of rolls 281 is below guide plates 282 at any given moment. A divider 283 having a narrow pointed edge 284 is positioned beneath rolls 281 and extends substantially the width of the conveyors. It is mounted on frame 264 by conventional means (not illustrated) and is pivotally movable about a pivot point 285.

Figure 12:
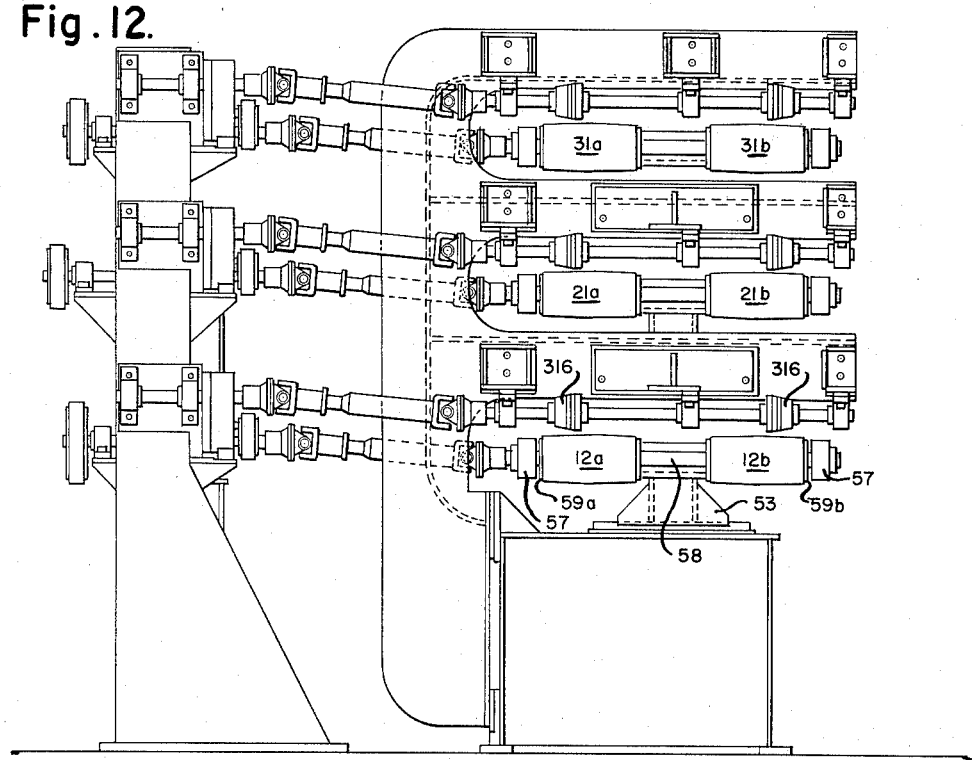
FIGURE 12 is a sectional view taken along line XII—XII of FIGURE 1.

FIGURE 12 illustrates the suspension of the conveyors at another point along the line. As can be seen from FIGURE 12, the mounting of the conveyors is similar to that already described and the figure need not be described in detail. It is apparent, however, that the various conveyor and magnet roll shafts are driven through a system of drive belts and countershafts similar to those which have been described and illustrated.

A plurality of electric motors are provided to drive the conveyors. In each instance the head pulley of the conveyor is driven, and the remaining pulleys on the conveyor are merely idlers which are driven by the belts. The overhead magnetic rolls associated with each conveyor are driven with their tangential speeds being equal to the linear speed of the belts on the associated conveyor. They are, of course, driven with an opposite direction of rotation from the conveyor shafts, and a sheet passing between them will be urged forwardly by both the magnet rolls and the conveyor belts toward the piling stations. Conveyors 1, 2 and 11 and their associated magnet rolls are driven by motor 273. The remaining conveyors and their associated magnet rolls are driven by motors 286, 287, 288, 289, 290, 291 and 292.

*The magnetic controls*

A schematic wiring diagram of the magnet and motor circuits is shown in FIGURE 14. A constant line voltage is applied across conductors 293 and 294. A motor bus bar 295 is connected to conductor 293 through a variable resistor 296. A magnet bus bar 297 is connected to conductor 293 through a variable resistor 298. Resistors 296 and 298 are ganged for single control. The shear motor speed controller is also operated with resistors 296 and 298. Motor 273 is connected between motor bus bar 295 and conductor 294, and a separate control resistor 299 is provided in series with that motor. The remaining conveyor drive motors except the piling conveyor drive motors are connected in similar manner between bus bar 295 and conductor 294, and separate speed regulators are provided for each motor. The piling conveyor drive motors are separately controlled.

The coils of the fixed electromagnets 85, 86, 87, 88, 89 and 90 mounted on catching conveyor 12 are connected in parallel between magnet bus bar 297 and conductor 294. Magnets 85, 86 and 87 are supplied through a current limiting resistor 300 and a variable resistor 301. Magnets 88, 89 and 90 are similarly supplied through a current limiting resistor 302 and a variable resistor 303. Both groups are supplied from a master rheostat 304 which will vary the current to all of the magnets 85, 86, 87, 88, 89 and 90 simultaneously. Resistor 301 will simultaneously vary the current to magnets 85, 86 and 87, and resistor 303 will simultaneously vary the current to magnets 88, 89 and 90. A switch 305 is provided to disconnect all of the fixed catching conveyor magnets from magnet bus bar 297. In a similar fashion, the catching conveyor movable electromagnets 65 and 66 are placed in parallel and are supplied through a current limiting resistor 306 and a variable resistor 307. Magnets 67 and 68 are similarly paralleled through current resistor 308 and variable resistor 309. Both pairs of magnets are supplied through a master rheostat 310 and a switch 311.

The lapping conveyor electromagnets 168, 169, 170, 171, 172 and 173 are connected between magnet bus bar 297 and conductor 294 in a manner identical to the fixed catching conveyor magnets. A variable resistor 312 controls magnets 168, 169 and 170. A variable resistor 313 controls magnets 171, 172 and 173, and a master rheostat 314 controls all of the piling conveyor electromagnets. A switch 315 is provided to disconnect all of the catching conveyor electromagnets.

It is to be understood that the electromagnets of catching conveyors 22 and 32 and of piling conveyors 23 and 33 are connected between magnet bus bar 297 and conductor 294 in a manner similar to that which has been described for the magnets on conveyors 12 and 13.

A schematic wiring diagram showing the control circuit for magnet roll 128 is illustrated in FIGURE 15. The roll is powered from two line current conductors 317 and 318. A relay 319 is connected to the pinhole detecting means through a suitable time delay mechanism by leads 320. When relay 319 is energized, it will close normally open switch 321 connecting coils 144 of magnet roll 128 between the line connections 317 and 318. Two parallel branches are provided between coils 144 and line 318. One branch passes through normally closed switch 322, and the other branch passes through fixed resistor 323 and variable resistor 324. When switch 321 is closed, it will also energize timer 325. When the timer is energized, it will, after a fixed interval, energize relay 326 thereby opening switch 322 and leaving the sole connection for coils 144 through resistors 323 and 324. Timer 325 will hold switch 322 in open position until switch 321 opens thereby resetting timer 325.

*Operation*

In readying the classifier for operation, the conveyor motor controls are adjusted to run the motors and shear at the desired speed. The motors for entrance conveyor 1, transfer conveyor 2, the lapping conveyors and the catching conveyors are all run at approximately the same speed and they are simultaneously varied with the speed of the shear. Entrance conveyor 1 and the others are driven somewhat faster than the strip entering the shear to provide a preferred spacing of three or four inches between sheets on entrance conveyor 1. The catching conveyors are driven at approximately one-half the speed of the preceding lapping conveyors. The piling conveyors are driven at a constant speed to produce good piling, usually at about 250 feet per minute.

The classifier may, of course, handle sheets of varying width and length whose size will be dependent upon the width of strip and the length of cut of the shear. The movable carriage of catching conveyor 12 is adjusted for the proper sheet length. Preferably, the distance from magnet rolls 276 to the center of electromagnets 65, 66, 67 and 68 is approximately equal to the length of sheet being handled by the classifier. Scale 110 is calibrated in inches for varying sheet lengths, and the carriage is adjusted until pointer 109 is opposite the desired scale mark. The carriages of catching conveyors 22 and 32 are similarly adjusted. The carriage drive motors on the catching conveyors are simultaneously controlled from a control panel, and the carriages on all of the catching conveyors are thus shifted simultaneously. Individual motor controls for fine adjustment of the separate carriages are also provided.

After the initial adjustments have been made to the classifier, strip is fed to the shear. The speed of strip feed, of the shear and of the classifier are all controlled by a master controller. As the strip passes into the shear, it is cut into sheets which pass between pinch rolls 35 and are deposited upon entrance conveyor 1. Conveyor 1 is operated at a somewhat higher speed than the shear to maintain a space of three or four inches between each sheet on conveyor 1. It will be understood that the strip has been inspected for pinholes and thickness by well-known means prior to being sheared. Where sections of the strip which are off-gauge or which have pinholes are detected, a time delay mechanism will be actuated to separate the resulting pinhole and off-gauge sheets at classifying stations 40 and 45. Sections of the strip having pinholes will be detected prior to the time the strip enters the shear. Suitable and well-known time delay means synchronized to the speed of strip passing through the shear and classifier will energize relay 319 as the leading end of the sheet having pinholes approaches magnetic roll 128. The action of relay 319 will close switch 321 and place the full voltage across conductors 317 and 318 on coils 144. After the magnetic field has become saturated, timer 315 will open switch 322, reducing the current through coils 144. After the last sheet having pinholes has passed roll 128, the power relay 319 will be cut off allowing switch 321 to reopen. Magnetic roll 152 is energized in a similar manner to deflect off-gauge sheets to the middle flight of conveyors.

As each sheet issues from pinch rolls 35 over the tail pulley of conveyor 1, it will be attracted to the conveyor by horseshoe magnets 140. The magnetic field is carried very close to the conveyor tail pulley by pole pieces 134. The pole pieces likewise extend the magnetic field toward magnetic roll 128. Sheets having pinholes are diverted at classifying station 40 and pass to the lower flight comprising conveyors 11, 12 and 13. As the leading end of a pinholed sheet approaches magnetic roll 128, the coils will be energized as has been described. The magnetic attraction at roll 128 is concentrated between the tips of pole pieces 142 and 143, and the magnetic attraction will firmly draw the leading edge of the sheet having pinholes to the conveyor belt. Urged by the magnetic attraction, the sheet will follow the curvature of magnetic roll 128 and will go down the sloping section 41 of conveyor 1 toward lapping conveyor 11. Magnets 147 and the associated pole pieces 145 create a strong magnetic field extending immediately from magnetic roll 128 to entrance conveyor head pulley. The magnets act to hold the sheet firmly to the sloping belt sections. Should the next succeeding sheet also have pinholes, the control means will maintain the current in coil 144 of magnetic roll 128, and the next sheet will in like manner follow the curve of the conveyor belt around magnetic roll 128 down the sloping portion 41 of entrance conveyor 1. Succeeding sheets having pinholes will follow in like manner. As the first sheet reaches the head pulley of conveyor 1, it will continue in its line of direction until the leading end hits lapping conveyor 11 and is deflected onto belt sections 11a and 11b. Lapping conveyor 11 is driven at the same speed as entrance conveyor 1 and there will be a smooth transfer without sliding between the sheet and the belts as the sheet changes direction.

Permanent magnets 159 and pole pieces 158 create a magnetic field extending from the tail pulley to the head pulley of conveyor 11. As the leading end of a sheet is projected from conveyor 1 toward conveyor 11, the leading end will be drawn toward conveyor 11 while the trailing end remains on the slope 41 of conveyor 1. As more of the sheet is transferred to lapping conveyor 11, the sheet will be more firmly attracted to the belt sections of conveyor 11. The trailing end will then leave entrance conveyor 1, and the sheet will be entirely upon the lapping conveyor 11. The spacing between entrance conveyor 1 and lapping conveyor 11 is sufficiently close that the shortest sheet handled by the classifier will never be out of the magnetic attraction of at least one conveyor while it is transferring between the conveyors. As the sheet is carried along lapping conveyor 11, it will be held continuously and firmly to the conveyor belt sections by magnets 159. As the sheet reaches the conveyor head pulley, its leading end will be projected beyond the head pulley.

The sheets are of relatively thin gauge, and as each is projected beyond the head pulley above catching conveyor 12, its natural tendency will be to droop. The leading end, however, will come within the field of magnetic rolls 276 which will draw the leading end of the sheet toward it. Guide plates 277 prevent the sheet from wrapping around or hitting headlong into magnetic rolls 276 and will keep it generally tangent to the rolls. The rolls will contact and lift the sheet near its edges, but the center of the sheet will be unsupported and will fall slightly, giving the sheet a concave upper surface and providing a certain amount of stiffness.

As the leading end of the sheet passes beyond rolls 276, it will come within the magnetic field produced by electromagnets 85, 86, 87, 88, 89 and 90. The sheet will, however, have transverse stiffness by virtue of its concave shape and will be projected above conveyor 12. Rolls 276, which are driven with a tangential velocity equal to the belt speed of conveyor 11, will project the sheets outwardly over conveyor 12 at a sustained speed. The belt sections of lapping conveyor 12, however, are driven at about one-half the speed of conveyor 11. Thus, the sheet will be traveling considerably faster than belt sections 12a and 12b. As the leading end of the sheet passes beyond the head pulley of conveyor 11, the sheet will remain generally out of contact with belt sections 12a and 12b and will be principally under the control of magnet rolls 276. As the trailing end of the sheet reaches magnet rolls 276 and passes beyond them, the sheet will no longer be held in a bowed position, and the trailing end will be pulled by electromagnets 85, 86, 87, 88, 89 and 90 firmly onto conveyor belt sections 12a and 12b. At this point, the leading end of the sheet will be approximately above electromagnets 65, 66, 67 and 68. The sheet will, therefore, be pulled into firm contact with the conveyor belt sections 12a and 12b at its leading and trailing ends at approximately the same moment. In view of the fact that the sheet is traveling approximately twice as fast as the conveyor belt sections, there will be a certain amount of sliding until friction between the belt sections and the sheet brings it to rest on the belt. The sheet is always under the control of at least one set of magnets while it is transferring from conveyor 11 to conveyor 12. The next sheet immediately behind will react in the manner just described. After a sheet is on the belts of conveyor 12, it will move at a slower speed than the sheet immediately behind. The leading end of the faster moving following sheet will be projected outwardly and will overlap the preceding sheet. The magnetic field of magnets 85, 86, 87, 88, 89 and 90 will be largely shunted by the sheet which is on the conveyor 12 which will further add to the tendency of the following sheet to cantilever above conveyor 12. The trailing end of the sheet on conveyor 12 will pass beyond magnets 85, 86, 87, 88, 89 and 90 while the next following sheet is still in contact with magnet rolls 276. When the trailing end of the cantilevered sheet passes beyond magnet rolls 276, it will be firmly and quickly drawn to conveyor 12 by the fixed electromagnets. In this manner, successive sheets are overlapped one upon another as they pass from the conveyor 11 to conveyor 12.

The sheets may be delivered on the conveyors in an oblique or twisted position. It is desirable to align them with the conveyor for smooth and easy piling. The obliqueness or skew may be corrected by imposing an uneven magnetic drag upon the sheet. Preferably, the magnetic pull or drag is increased on the side of the sheet which is advanced over the other. In the first conveyor flight, variable resistors 301 and 303, 307 and 309, and 312 and 313 may be used for this purpose. Principally, the adjustment is made to resistors 301 and 303 thereby affecting the relative strength or pull of the groups comprising magnets 85, 86 and 87 and magnets 88, 89 and 90. Supplemental adjustments may be made by varying the pull of the other groups of electromagnets.

As the lapped sheets are carried along catching conveyor 12, they will be held firmly to the conveyor belt by the electromagnets, permanent magnets and pole pieces beneath the belt sections, and they will be carried to the end of the catching conveyor. The first sheet will transfer from catching conveyor 12 to piling conyevor 13 in the same manner in which it transferred from lapping conveyor 11 to catching conveyor 12.

Frequently, only a single isolated sheet having pinholes is deflected at classifying station 40. At such times the single sheets will pass along conveyors 11, 12 and 13 in the manner described but will not, of course, be lapped with other sheets. At times a single sheet and the second sheet behind it may be deflected because of pinholes. In this case, the sheets may be lapped as they transfer from catching conveyor 12 to piling conveyor 13.

As sheets which do not have pinholes approach classifying station 40, magnetic roll 128 will not be energized, and the sheets will pass directly to transfer conveyor 2. Magnets on transfer conveyor 2 will hold the sheets firmly on the belts and carry them to classifying station 45. At classifying station 45, sheets which are off-gauge are deflected to conveyors 21, 22 and 23 and piling station 46. They are handled along conveyors 21, 22 and 23 in the same manner that pinhole sheets are handled along conveyors 11, 12 and 13. Prime sheets which are not off-gauge and do not have pinholes will continue through classifying station 45 along conveyors 31, 32 and 33 to piling station 47, being handled in the same manner as reject sheets.

Prime and off-gauge sheets will be handled at classifying station 45. Magntic roll 152 at classifying station 45 is identical to magnetic roll 128 which has already been described. Magnet rolls 281 are supported beyond and above magnetic roll 152 but short of the tail pulley of conveyor 31. Rolls 281 are driven with their tangential speed equal to the speed of conveyor 2. As prime sheets on conveyor 2 approach magnetic roll 152, the coils within magnetic roll 152 will be de-energized. The sheets will be firmly held to conveyor 2 by the permanent magnets in the manner previously described until they are virtually at magnetic roll 152. In the absence of any pull from magnetic roll 152, the leading end of the sheet will continue in approximately the same direction and will have its leading end projected outwardly toward conveyor 31. The leading end of the sheet will very quickly come within the magnetic field of magnet rolls 281 which will lift the leading end of the sheet toward guide plates 282. The sheet will be generally tangent to magnet rolls 281 and will be lifted by it and carried forward. As the leading end of the sheet passes beyond magnet rolls 281, it will shortly thereafter come within the field of the permanent magnets on conveyor 31. The leading end will then be pulled downwardly to belt sections 31a and 31b and carried along the belt. Any given section of a prime sheet will therefore be successively held down on conveyor 2, lifted by magnet rolls 281 and held down onto conveyor 31. At a given moment, the leading end of a prime sheet may be held to conveyor 31 by the permanent magnets thereunder, the middle section lifted to magnet rolls 281 and the trailing end held to conveyor 2 by the permanent magents thereunder. The sheet is under control of the magnets at all times in transferring from conveyor 2 to conveyor 31 and is successively pulled downwardly, then upwardly and then downwardly. Divider 283 remains in a fixed position and does not operate to direct sheets to different conveyors. It principally serves to channel the sheets in one direction or another after the initial classification or split has been made. It further serves to protect the tail pulley and belts of conveyor 31 should control of magnetic roll 152 fail while the classifier is in operation.

Classifying station 40 is identical to and operates in the same manner as classifying station 45 except that pinhole sheets on the one hand are separated from prime and off-gauge sheets on the other hand at classifying station 40, whereas, at classifying station 45, off-gauge sheets are separated from prime sheets.

The velocity of the sheets will vary with the speed of the classifier, which will be frequently adjusted during operations because of variations in the speed with which strip may be fed to the shear. The kinetic energy of the sheets and consequently the amount of energy which must be absorbed in reducing the speed of the sheets and piling them will vary as the square of the velocity. It has been found that if the electromagnets strong enough to stop the sheets at full speed are employed at the belt transfer points, the sheets will be so firmly held to the conveyor at low speed that it is impossible to make a satisfactory transfer and lapping operation. The ends of the sheets cannot be projected outwardly above the preceding sheets. The electromagnets are designed to operate below the saturation point in the range where the flux density will be proportional to the magnetizing current. The pull of the magnets is proportional to the square of the flux density or to the square of the magnetizing current. As has been previously pointed out, the current to the coils of the electromagnets will be varied with the speed of the line. Thus, the magnetic field of the electromagnets will vary directly with the kinetic energy of the sheets. After the initial adjustment has been made, the magnets will automatically provide the necessary pull at any classifier speed.

The tension of the conveyor belt sections may be regulated by adjustment of the associated tail pulley section. After the proper adjustment for tension has been made, the belt may be made to track properly by increasing or decreasing the tension on one side of the belt only. From time to time, it will be necessary to replace worn belts. To remove a belt section, the associated tail pulley section is backed off to produce slack in the belt. The belt sections on the side away from the drive motors may be readily slipped off, and a new belt installed and adjusted. Before removing belt sections on the side nearest the drive motors, it is first necessary to break one of the couplings connecteing the belt head pulley to the drive means. The drive shaft is then swung out of the way, and the belt may be readily removed and replaced.

From the foregoing, it will be apparent that I have inventioned new and useful methods and apparatus for classifying and piling sheets. The sheets are kept in close control at all times and cobbles or malfunctioning due to sheets which are out of control is virtually eliminated. The classifier will operate satisfactorily at any desired speed and its operation is not critical while attaining a desired operating speed or while the operating speed is being changed. It will operate satisfactorily at much higher speeds than those which could be obtained by previous classifiers and has been operated satisfactorily at speeds in excess of two thousand feet per minute.

While I have described a present preferred embodiment of my invention, it will be understood that I do not limit myself thereto and that my invention may be otherwise variously practiced within the scope of the following claims.

I claim:

1. In a sheet classifier, a sheet catching conveyor having endless belts traveling over tail pulley means toward head pulley means, a plurality of magnets positioned beneath the belts and spaced laterally across the conveyor adjacent the tail pulley means, a second plurality of magnets positioned beneath the belt and spaced away from the tail pulley toward the head pulley means, and means to vary the pulling strength of some of said magnets simultaneously with variation in speed of the conveyor.

2. In a sheet classifier, a sheet catching conveyor having endless belts traveling over tail pulley means toward head pulley means, a plurality of magnets positioned beneath the belts and spaced laterally across the conveyor adjacent to the tail pulley means, means to vary the pulling strength of said magnets proportionally with the kinetic energy of sheets on the conveyor, and a second plurality of magnets longitudinally movable along the conveyor beneath the belts.

3. In a sheet classifier, a sheet catching conveyor having endless belts traveling over tail pulley means toward head pulley means, a plurality of electro-magnets positioned beneath the belts and spaced laterally across the conveyor adjacent to the tail pulley means, a movable carriage mounted on the framework of said conveyor beneath the belts, a plurality of electro-magnets mounted on said carriage, and means to vary the pulling strength of all said electro-magnets simutaneously with the speed of the conveyor.

4. In a sheet classifier, a sheet catching conveyor having endless belts traveling over tail pulley means toward head pulley means, a plurality of electro-magnets positioned beneath the belts and spaced laterally across the conveyor adjacent to the tail pulley means, a carriage movable axially along the framework of the conveyor beneath the belts, a plurality of electro-magnets mounted on the conveyor, means to vary the pulling strength of said electro-magnets proportionally to the kinetic energy of sheets being transported on said conveyor, and additional magnets mounted on the carriage.

5. In a sheet classifier, a sheet catching conveyor having endless belts traveling over tail pulley means toward head pulley means, a plurality of electro-magnets positioned beneath the belts and spaced laterally across the conveyor adjacent to the tail pulley means, a movable carriage mounted on the framework of said conveyor beneath the belts, a plurality of electro-magnets mounted on said carriage, a plurality of magnets positioned beneath the belts adjacent to the head pulley means, and means to vary the pulling strength of all of said electro-magnets simultaneously with the speed of the conveyor.

References Cited by the Examiner

UNITED STATES PATENTS

| | | | |
|---|---|---|---|
| 1,490,594 | 4/24 | Lateur. | |
| 1,589,091 | 6/26 | Barber | 198—121 |
| 1,597,778 | 8/26 | Fisk. | |
| 2,008,200 | 7/35 | Clauss | 198—41 |
| 2,291,261 | 7/42 | Taylor | 198—41 |
| 2,642,174 | 6/53 | Buccicone | 198—41 |
| 2,697,506 | 12/54 | Snyder | 198—41 X |
| 2,762,492 | 9/56 | Hopkins | 198—139 |
| 2,788,116 | 4/57 | Wood | 198—139 |
| 2,792,103 | 5/57 | Piemont | 198—121 |

SAMUEL F. COLEMAN, *Primary Examiner.*

ERNEST A. FALLER, EDWARD A. SROKA,
*Examiners.*